(12) United States Patent
Kraft et al.

(10) Patent No.: US 9,878,859 B2
(45) Date of Patent: Jan. 30, 2018

(54) DEVICE AND METHOD FOR SEPARATING AN ITEM FROM A STACK OF ITEMS

(71) Applicant: Sanofi-Aventis Deutschland GMBH, Frankfurt am Main (DE)

(72) Inventors: Torsten Kraft, Frankfurt am Main (DE); Axel Forstreuter, Frankfurt am Main (DE); Markus Oschmann, Frankfurt am Main (DE); Guido Russ, Frankfurt am Main (DE); Hendrik Hoppe, Frankfurt am Main (DE)

(73) Assignee: Sanofi-Aventis Deutschland GMBH, Frankfurt am Main (DE)

( * ) Notice: Subject to any disclaimer, the term of this patent is extended or adjusted under 35 U.S.C. 154(b) by 0 days.

(21) Appl. No.: 14/779,641

(22) PCT Filed: Apr. 1, 2014

(86) PCT No.: PCT/EP2014/056492
§ 371 (c)(1),
(2) Date: Sep. 24, 2015

(87) PCT Pub. No.: WO2014/161832
PCT Pub. Date: Oct. 9, 2014

(65) Prior Publication Data
US 2016/0052730 A1    Feb. 25, 2016

(30) Foreign Application Priority Data
Apr. 3, 2013 (EP) .................................. 13162204

(51) Int. Cl.
*B65G 59/04*    (2006.01)
*B65G 47/91*    (2006.01)

(52) U.S. Cl.
CPC ............. *B65G 59/04* (2013.01); *B65G 47/91* (2013.01)

(58) Field of Classification Search
CPC .................................. B65G 59/04; B65G 47/91
(Continued)

(56) References Cited

U.S. PATENT DOCUMENTS 3,012,760 A * 12/1961 McGrath .................. F24F 1/01
165/109.1
4,553,892 A * 11/1985 Huffman .................. B25J 13/08
294/186
(Continued)

FOREIGN PATENT DOCUMENTS

CN        1226370     8/1999
CN       101941595    1/2011
(Continued)

OTHER PUBLICATIONS

International Preliminary Report on Patentability in International Application No. PCT/EP2014/056492, issued Oct. 6, 2015, 7 pages.
(Continued)

*Primary Examiner* — Jeanette E Chapman
(74) *Attorney, Agent, or Firm* — Fish & Richardson P.C.

(57) ABSTRACT

The present invention relates to a separating device and to a respective method for separating an item from a stack (12) of items (14), the separating device comprising: —a carrier unit (20; 40; 50) having a support surface (24; 44; 54) to support numerous items (14) stacked on top of each other in an axial direction (z), and having at least a first discharge outlet (25; 45; 55) for a pressurized fluid to at least partially raise the stack (12) of items (14) from an initial position into an elevated position relative to the support surface (24; 44; 54) and to keep at least several items (14) of the stack (12) in the elevated position, —a gripping unit (30; 60) having at least one suction nozzle (38; 68) to grip the uppermost item (14) when the stack (12) is in the elevated position, and— wherein the carrier unit (20; 40; 50) and the gripping unit
(Continued)

(30; 60) are displaceable relative to each other at least in the axial direction (z).

17 Claims, 8 Drawing Sheets

(58) Field of Classification Search
USPC ..... 414/795.5, 796.5, 796.6, 797; 211/41.12; 221/278; 271/20, 3.05, 3.11, 97–99
See application file for complete search history.

(56) References Cited

U.S. PATENT DOCUMENTS

| | | | | |
|---|---|---|---|---|
| 4,635,988 A | * | 1/1987 | Potters | B65G 47/91 294/186 |
| 4,707,012 A | * | 11/1987 | Takagi | B65G 47/91 414/752.1 |
| 6,153,887 A | | 11/2000 | Furuta | |
| 6,457,693 B1 | | 10/2002 | Nagai et al. | |
| 6,558,109 B2 | | 5/2003 | Gibbel | |
| 7,637,713 B1 | * | 12/2009 | Parette | G11B 17/08 271/98 |

FOREIGN PATENT DOCUMENTS

| | | | | |
|---|---|---|---|---|
| DE | 202010015939 | * | 2/2011 | ............. B65G 47/91 |
| DE | 102013009344 | * | 12/2014 | ........... B66C 1/0212 |
| EP | 0 776 830 | | 6/1997 | |
| JP | 60258022 A | * | 12/1985 | |
| JP | 2000-117553 | | 4/2000 | |
| NZ | WO 2011159173 A2 | * | 12/2011 | ........... B25B 11/005 |

OTHER PUBLICATIONS

International Search Report and Written Opinion in International Application No. PCT/EP2014/056492, mailed Jul. 11, 2014, 11 pages.

* cited by examiner

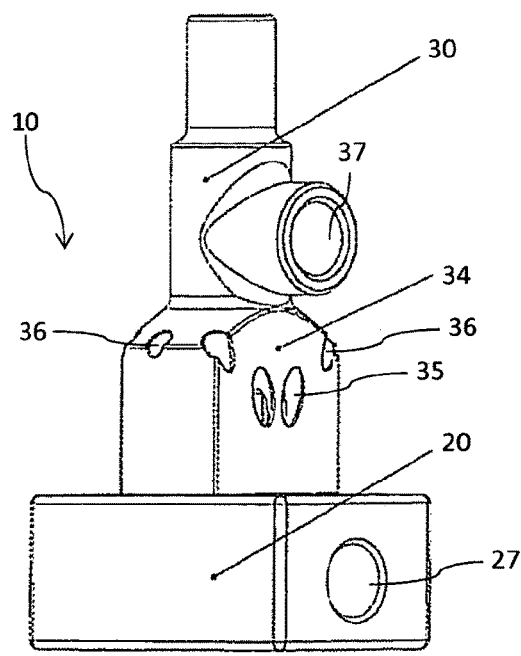
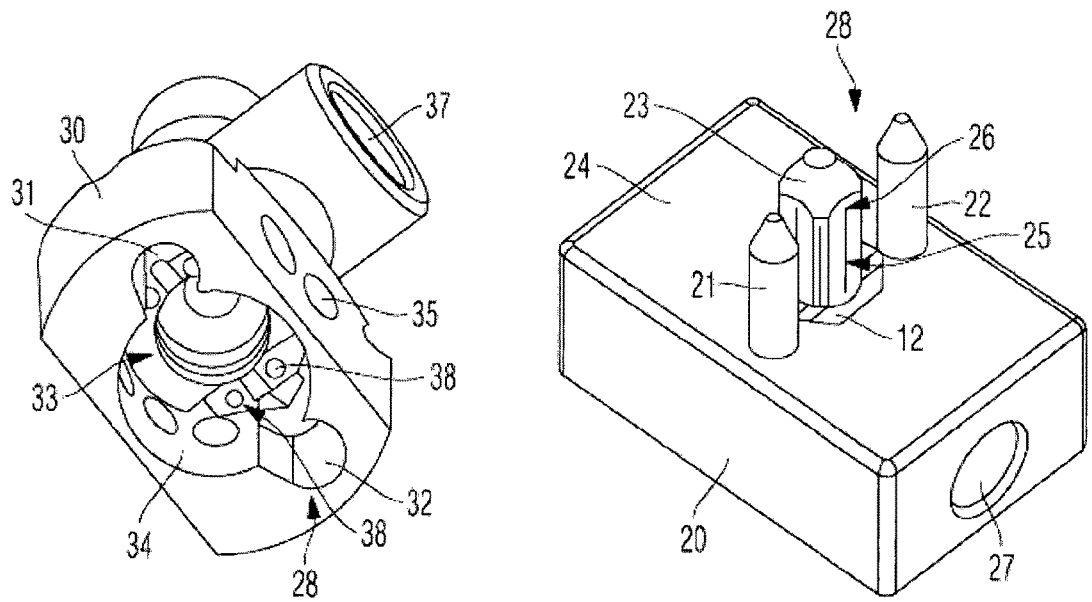
Fig. 1
Fig. 2
Fig. 3

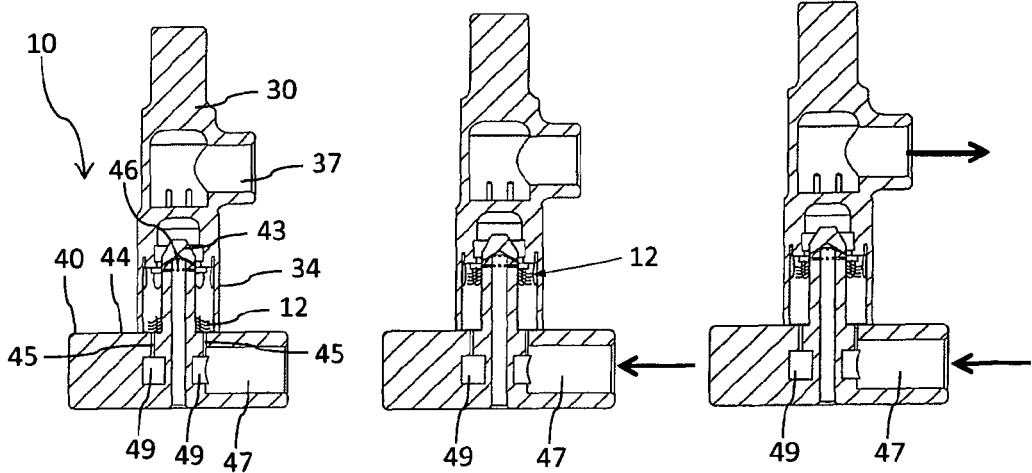
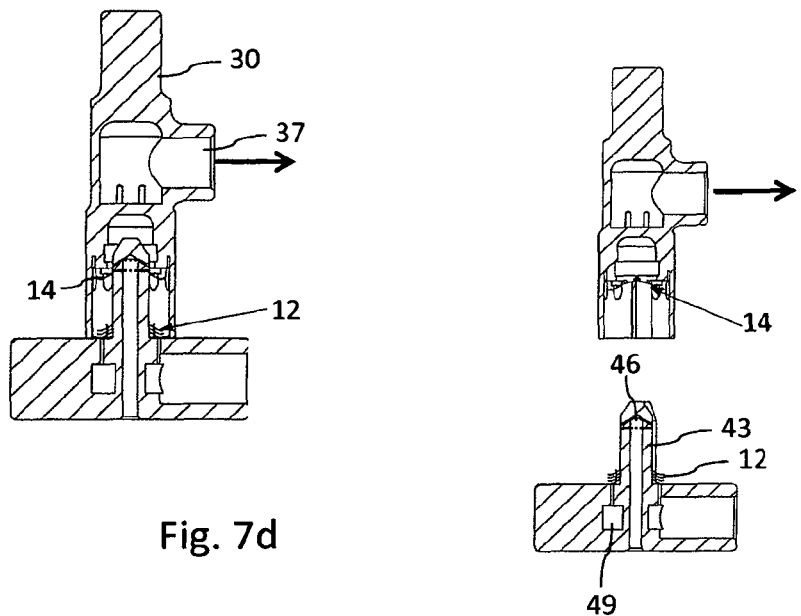

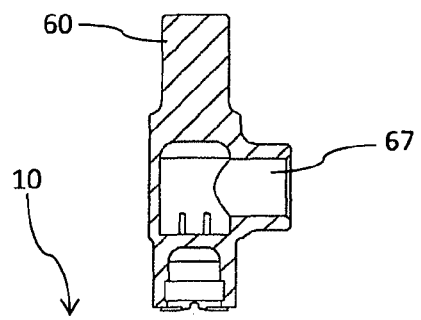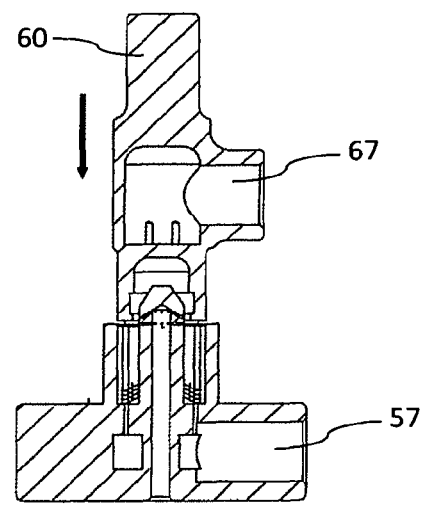
Fig. 11a
Fig. 11b
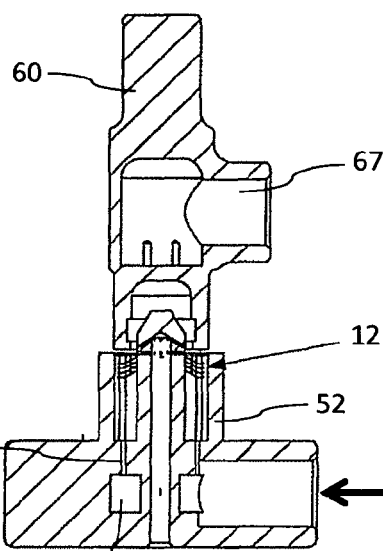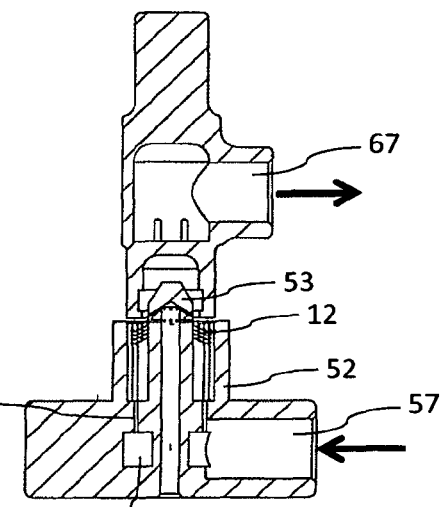
Fig. 11c
Fig. 11d

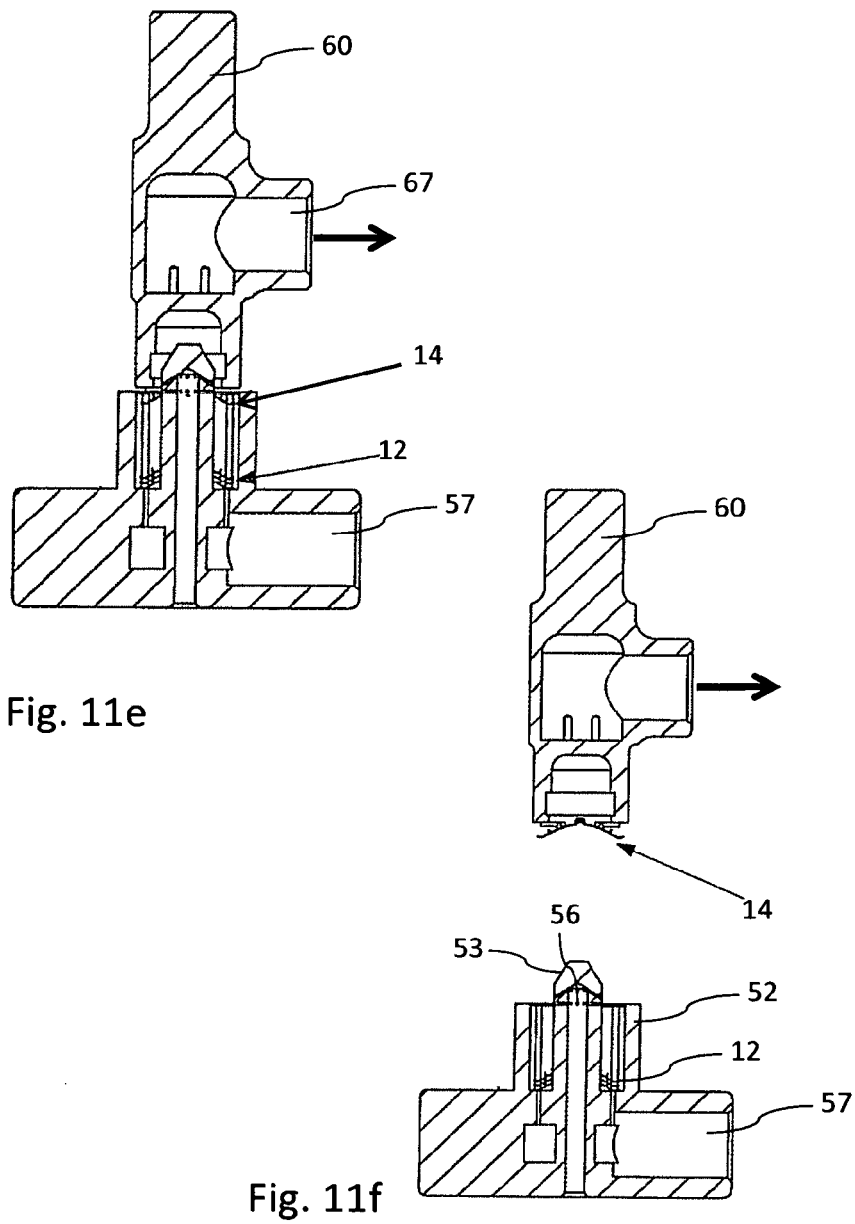

DEVICE AND METHOD FOR SEPARATING AN ITEM FROM A STACK OF ITEMS

CROSS-REFERENCE TO RELATED APPLICATIONS

This application is a U.S. national stage application under 35 USC § 371 of International Application No. PCT/EP2014/056492, filed on Apr. 1, 2014, which claims priority to European Patent Application No. 13162204.5, filed on Apr. 3, 2013, the entire contents of which are incorporated herein by reference.

FIELD OF THE INVENTION

The present invention relates to the field of singulating or separating devices, by way of which a single item can be separated from a stack of items, in particular in a fully or semi-automated assembly line. Moreover, the present invention also relates to a method of separating an item from a stack of items by making use of the separating device.

BACKGROUND

In mass manufacturing and mass assembly processes, various items, such like substantially planar-shaped or disc-like items, typically provided in a stack of items, have to be singulated or separated from each other in order to allow for a proper and precise assembling of the item with other objects to be mutually assembled. Depending on the geometry of the items, their separation is sometimes tricky and cumbersome. For instance with rather tiny, low weight disc-like or planar shaped items, which may also be arched or curved, it is rather elaborate to precisely separate a single item form a stack of items that e.g. extends in an axial direction.

Gripping for instance of an uppermost item e.g. by means of a suction cup requires to bring the suction cup in direction contact with the respective item. This requires that the suction cup has to be positioned in various axial height above the stack. Here, the height varies with stack size and the number of items of the respective stack. Especially when the items are of non-planar geometry, arranging numerous items on top of each other in a stack may eventually lead to a jamming or tilting of items. When gripping the uppermost item of the stack, the suction cup may get in direct contact with the respective item. As a consequence, the entire stack may become subject to axial compression as the suction cup hits or engages with the uppermost item. Due to such an axial compression, various items of the stack may get caught or may mutually catch, their separation may therefore become rather crucial and complex.

Taking or gripping of the uppermost item from a vertically or axially extending stack of items also generally requires a respective axial height adjustment between the stack of items and the suction cup. By successively separating items from the stack of items, the total axial or vertical height of the stack successively reduces and therefore requires a rather delicate and precise positioning of the suction cup for not exerting significant axial pressure to the stack.

Moreover, a contact-based gripping of an item may also lead to significant abrasion or wear of the items and their surface.

Additionally, a sensor-based positioning of at least a suction cup or some other gripping tool relative to a stack-supporting carrier unit may require implementation of comprehensive sensor equipment, which is rather expensive and which may further limit the cycle time of an assembly- or manufacturing process.

Moreover, if the items to be separated are subject to geometric tolerances, a sensor-based gripping and separation as well as a well-defined mutual positioning and alignment of a stack-supporting carrier unit and a suction cup is rather susceptible to malfunction and may therefore lack sufficient reliability.

It is therefore an object of the present invention to provide an improved separating device, which is highly reliable and which provides a well-defined and precise separation of a single item from a stack of items. The separating device should comprise a rather simple structure and should support rather short cycle times for a mass assembly or mass manufacturing process. Additionally, the separating device should avoid or reduce exertion of axial pressure to the stack and should further provide an operation mode, which is rather independent of the actual height of the stack. Additionally, a respective method for separating an item from a stack of items should be provided, which is highly reliable and by way of which a well-defined successive separation of single items from a stack of items can be provided.

SUMMARY OF THE INVENTION

In a first aspect the invention relates to a separating device for separating an item from a stack of items. The separating device comprises a carrier unit and a gripping unit. The carrier unit typically supports numerous items on a support surface. The carrier unit is particularly adapted to support numerous items in a stacked configuration, in which the items are stacked on top of each other in an axial direction (z).

The carrier unit further has at least a first discharge outlet for a pressurized fluid to raise the stack of items from an initial position into an elevated position relative to the support surface. In the elevated position or configuration the entire stack or at least a part thereof, namely at least one or several items, are kept in a lifted, elevated or raised configuration compared to their initial position, in which all items of the stack are located and positioned on top of each other in such a way, that the entire stack rests on the support surface. The first discharge outlet is configured to deliver and to direct a pressurized fluid to the stack of items in such a way that at least a portion of the stack, i.e. several items of the stack, is or are raisable from the initial position into the elevated position. The first discharge outlet is further configured to constantly provide a stream of the pressurized fluid in order to keep the at least several items of the stack or to keep the entire stack in the elevated position for a least a predetermined time interval.

The carrier unit and the gripping unit are displaceable relative to each other at least in or along the axial direction (z). In this way, the gripping unit can be moved towards the stack of items which is raised into the elevated position by the pressurized fluid in such a way, that the gripping unit is operable to grip the uppermost item of the stack by means of at least one suction nozzle.

Having numerous items arranged in a stack on the support surface of the carrier unit, the entire stack or at least an upper portion thereof can be raised into the elevated position by supplying a pressurized fluid to the at least first discharge outlet of the carrier unit. In response to such a fluid supply, the stack or at least an upper portion thereof raises into a well-defined elevated position, in which the uppermost item is grippable by the suction nozzle of the gripping unit.

Before, during or after lifting of the stack of items, gripping unit and carrier unit are to be positioned relative to each other in such a way, that the gripping unit gains access to the uppermost item of the elevated stack of items. Thereafter, when the uppermost item of the stack of items is gripped or taken by the gripping unit, the gripping unit may be displaced and positioned elsewhere according to a manufacturing or assembly process.

During or before the carrier unit moves away from the carrier unit with the uppermost item attached thereto, feeding of the pressurized fluid to the first discharge outlet of the carrier unit may be decreased or stopped so that the residual items of the stack return into their initial position, e.g. under the effect of gravity.

By raising or lifting of the stack of items by means of the at least first discharge outlet of the carrier unit, the uppermost item of the stack of items can be displaced to a well-defined gripping position, in which the uppermost item can be kept in an almost contactless configuration in regard to the gripping unit and its suction nozzle. It is of particular benefit, when the gripping position of the uppermost item is defined by the carrier unit. When the uppermost item is for instance in this well-defined gripping position, there may evolve a well-defined distance or gap between the gripping unit and/or its suction nozzle with respect to the upper surface of the uppermost item.

It is then only due to applying a suction effect via the at least one suction nozzle, that the uppermost item is contactlessly raised from the stack and engages with the gripping unit. In said gripping position the distance between the uppermost item and the gripping unit may also equal zero. Then the uppermost item would be effectively lifted and raised by the pressurized fluid until it engages and abuts with the gripping unit and/or its suction nozzle.

The at least first discharge outlet is oriented upwardly, in axial direction. It is configured to direct the pressurized fluid upwardly to the stack of items or to at least several items thereof. Irrespective of its position on, in or at the carrier unit the at least first discharge outlet may be configured to direct the pressurized fluid away from the support surface in an upward direction or in the axial direction. The discharge outlet may extend or may be oriented at a predetermined angle ranging from 0° to 75° with regard to the surface normal of the support surface. In other words, it may extend upwardly at an angle between 15° to 90° with respect to the plane of the support surface, wherein the support surface typically extends perpendicular to the axial direction.

According to a further embodiment, the carrier unit comprises at least a second discharge outlet for the pressurized fluid to keep the stack of items in the elevated position and hence to limit a rising of the stack or a portion thereof. The second discharge outlet is adapted to provide a sealing or blocking fluid to the stack of items when reaching the elevated position. By means of a sealing or blocking fluid raising of the stack can be limited so that the uppermost item is not lifted above or beyond the pre-defined gripping position. The second discharge outlet is configured to provide a second pressurized fluid to act against the effect of the first pressurized fluid and to limit a rising of the stack or a portion thereof induced by the pressurized fluid emanating from the first discharge outlet. By means of first and second discharge outlets, the entire stack of items or at least various items thereof can be lifted and can be kept in the elevated position in a rather stable or rather free floating position.

By means of first and second discharge outlets, the stack of items can be raised from the support surface and can be stably kept in the elevated position above the support surface. In effect, the sealing or blocking fluid emanating from the at least second discharge outlet flows in a different direction compared to the pressurized fluid emanating from the first discharge outlet. For this, first and second discharge outlet are correspondingly directed in different orientations. Moreover, first and second discharge outlets are typically separated in axial direction. Whereas the pressurized fluid emanating from the first discharge outlet may exert a lifting force to a lower surface of the stack or various items thereof, the pressurized fluid emanating from the second discharge outlet may be effective on or to the upper surface of the uppermost item.

By axially displacing the entire stack and/or various items thereof exclusively by means of a pressurized fluid and/or by means of a suction effect, respective elevating or gripping forces exerted to the entire stack or to various items thereof may act in a rather homogeneous way across the upper and/or lower surfaces of the items. In this way, jamming, tilting or canting and hence mutual engaging or interlocking of individual items can be effectively counteracted or even entirely prevented.

In another embodiment, the carrier unit further comprises a support member extending in axial direction from the support surface. By means of the support member, the stack of items can be guided in axial direction between the initial position and the elevated position. Furthermore the support member also supports that the stack of items is slidably displaced against a restoring force, typically against gravity. The support member is typically adapted to the geometry and overall shape of the items and their arrangement in the stack. The guiding member or a respective guiding structure may either encircle the stack or may penetrate the stack in axial direction to provide a well-defined and tilt free axial displacement of the entire stack.

Typically, the carrier unit is positioned below the gripping unit and the support member extends from the support surface towards the gripping unit.

The support member further serves to stabilise the stack of items. In this way, it is even conceivable, that the carrier unit is actually displaced relative to the gripping unit to provide separation of the uppermost item. However, in other embodiments it is the gripping unit which is displaceably arranged relative to the carrier unit for separating an item from the stack. Additionally, it is also conceivable, that both, carrier unit and gripping unit are displaceably arranged at least in axial direction (z) and/or along at least one direction of the lateral plane (x, y) extending perpendicular to the axial direction (z).

In a further embodiment, the support member comprises an elongated pin to extend through an orifice or through opening of each item. Here, each item comprises at least one orifice or through opening to receive the pin-shaped support member. The items may be of annular shape, disc-like shape or of prismatic shape. They may be substantially planar and may extend in the lateral plane when arranged on the support member and the support surface. When the orifice is located centrally in each pin, it is sufficient to have only one support member. However, if the items comprise several orifices located at a distance from each other, numerous support members may be required to axially guide the stack of items between the initial and the elevated position.

The items do not necessarily have to be of planar shape. It is in particular conceivable, that the items comprise an at least partially curved or arched shape. Moreover, the items may comprise or may be designed as a disc spring which is even flexibly deformable.

According to another embodiment, the second discharge outlet is located at an upper end section of the support member that faces away from the support surface or which is located at a predefined distance from the support surface, in particular above the support surface. By integrating the second discharge outlet in an upper end section of the support member, the uppermost item can be hindered to be raised beyond the upper end section of the support member. In this way and even without the aid of the gripping unit, the second discharge outlet serves to confine and to limit an upwardly directed pressurized fluid-induced displacement of the uppermost item and/or of the entire stack of items.

According to another embodiment, the second discharge outlet is oriented radially outwardly and is located flush with the outer circumference of the support member. By not protruding from the outer circumference of the support member, the second discharge outlet does not hinder the uppermost item to be lifted from the stack of items by means of the gripping unit. Additionally, the radially outwardly oriented discharge outlet provides an axial stop feature and effectively impedes uncontrolled axial displacement of the uppermost item, e.g. beyond the gripping position.

The second discharge outlet does not have to be oriented strictly radially outwardly from e.g. a tubular-shaped pin-like support member. Since the geometry of the support member may vary with the geometry of the items, the support member may also comprise a somewhat rectangular or prismatic cross-section.

Furthermore, the direction or orientation of the at least one second discharge outlet typically coincides with the lateral plane (x, y). Additionally or alternatively, the second discharge outlet may also extend at an arbitrary angle with regard to the outer circumference of the support member. It may be oriented substantially tangentially or may even extend substantially perpendicular from the outer circumference of the support member. Moreover, the second discharge outlet may not only coincide with the lateral plane but may also be oriented at a predefined angle with respect to the lateral plane. Hence, the direction of the second discharge outlet may have a component extending in axial direction, e.g. downwardly toward the support surface of the carrier unit. This way, the pressurized fluid emanating from the second discharge outlet may exert a downward directed axial force effect to the stack or to individual items thereof.

The pressurized fluid emanating from the second discharge outlet may therefore counterbalance the raising or lifting effect arising from the pressurized fluid emanating from the first discharge outlet.

According to another aspect, the carrier unit and the gripping unit are transferable into a mutual abutment configuration to form a confined volume in which the stack of items is displaceable between the initial and elevated position. Typically, the gripping unit features a receptacle to at least partially cover or to at least partially receive the stack of items in both positions, namely in the initial position, in which the stack rests on the support surface and in the elevated position, in which the uppermost item may be taken by the gripping unit.

By forming of a confined volume by means of the carrier unit and the gripping unit, the flow of the pressurized fluid can be easily and precisely controlled. Moreover, by means of a confined volume also the flow rate of the pressurized fluid can be controlled or even regulated, which allows for an intuitive and easy modification of lifting or blocking forces for raising and keeping the stack of items in an almost free floating elevated position or configuration.

According to another embodiment, the gripping unit comprises at least one discharge outlet cooperating with the carrier unit's second discharge outlet. In this way, a cushion of the pressurized fluid can be formed, in particular inside the confined volume for keeping the stack of items in the elevated position. By means of the discharge outlet, pressurized fluid emanating from the second discharge outlet of the carrier unit can be guided inside the confined volume in a rather controlled and well-defined way.

The total number, size, position and orientation of the at least one discharge outlet typically depends on the overall geometry of carrier unit, gripping unit, as well as on the geometry of the confined volume formed by carrier unit and gripping unit. Moreover, the gripping unit's discharge outlet may further be adapted to the type, shape and size or geometry of the items to be separated from each other.

By means of providing a cushion of the pressurized fluid, the elevated stack of items can be kept in the elevated position substantially free of forces. In particular, the cushion of pressurized fluid may further support separation of stacked items, especially when at least one or several streamlets are provided that may axially enter between the stacked items. Hence, by means of the cushion of pressurized fluid, the stack of items can be loosened up.

Since the carrier unit may comprise numerous first discharge outlets arranged in a regular or homogeneously distributed order in regard to the size and geometry of the items, there may also be provided several second discharge outlets regularly or equidistantly arranged e.g. at the outer circumference of the support member.

In a similar way the gripping unit may also comprise several discharge outlets or discharge exhausts that are regularly arranged at an outer circumference of the gripping unit. Even though the gripping unit's discharge outlets cooperate and correspond with the carrier unit's second discharge outlet or its various outlets, pressurized fluid entering the confined volume via the first discharge outlet of the carrier unit may also discharge via the gripping unit's discharge outlets.

Hence, the gripping unit may comprise various discharge outlets that may either be arranged at an axial distance with respect to each other. Here, at least one or several discharge outlets may correspond and cooperate with the second discharge outlets of the carrier unit while further gripping unit's discharge outlets may be arranged and designed to correspond and to cooperate with the carrier unit's first discharge outlets.

In this way, the pressurized fluid emanating from first and second discharge outlets of the carrier unit can be guided through the confined volume formed by the carrier unit and the gripping unit in a rather well-defined and controlled way.

By means of the various discharge outlets of the gripping unit a well-defined ram pressure may build up in the confined volume. Control of a stack raising ram pressure inside the confined volume is even facilitated when the gripping unit and the carrier unit sealingly engage when in mutual abutment configuration.

According to another embodiment, the separating device further comprises a centering structure to mutually align the carrier unit and the gripping unit in the lateral plane (x, y) which extends perpendicular to the axial direction (z). The centering structure typically comprises a centering pin extending in axial direction to engage with a correspondingly-shaped centering receptacle or centering recess.

The centering pin is typically provided at the carrier unit and/or at the gripping unit while the centering receptacle may be provided at the gripping unit and/or the carrier unit.

Typically, the centering structure serves to displace the carrier unit and the gripping unit relative to each other as soon as gripping unit and carrier unit approach in axial direction. For this purpose, the centering structure, in particular a centering pin and/or a centering receptacle are provided with inclined or bevelled contact surfaces that get in mutual contact upon axial approaching of gripping and carrier unit.

According to another embodiment, the centering structure comprises at least one centering pin extending from the carrier unit in axial direction. Moreover, the centering structure also comprises a correspondingly-shaped centering receptacle provided on or extending into the gripping unit. The at least one centering pin of the carrier unit is adapted to engage with the correspondingly-shaped centering receptacle when carrier unit and gripping unit approach in axial direction. In this way, the carrier unit and the gripping unit can be appropriately aligned in the lateral plane when carrier unit and gripping unit get in mutual abutment, thereby forming the confined volume for the displaceable stack of items.

In an alternative embodiment, it is the gripping unit that comprises the at least one centering pin extending towards the carrier unit while the carrier unit comprises a correspondingly-shaped centering receptacle. Moreover, also the support member may provide a centering function. It may also comprise a bevelled or tilted surface at its free end facing away from the support surface of the carrier unit. The pin-shaped support member may therefore laterally align with a correspondingly-shaped receptacle of e.g. a cup-shaped gripping unit.

According to a further embodiment, numerous first discharge outlets are located along the outer circumference of the support member. Here, the discharge outlets may be directed radially outwardly and may point in axial direction at an angle of at least 15°, at least 30° or at least 45° with regard to the lateral plane. Here, the discharge outlet may point upwardly at the given angles and may hence face away from the carrier unit's support surface.

By having numerous first discharge outlets separated along the outer circumference of the support member in both, circumferential as well as in axial direction, numerous items of the stack of items can be simultaneously exposed to the pressurized fluid. As a consequence, not only a bottom or undermost item but several items distributed in axial direction in the stack may directly experience an upwardly directed lifting force arising from the pressurized fluid.

Moreover, by having numerous first discharge outlets separated in circumferential and axial direction on the outer circumference of the support member, the stack of items can be loosened up while raised into the elevated position. In this way, jamming, tilting and mutual catching or interlocking of adjacently disposed items of the stack can be prevented or at least counteracted.

In a further embodiment, the first discharge outlets are helically positioned or helically arranged along the support member. The helical arrangement of the first discharge outlets serves to induce a helical or screw-type motion to the items while raised or lifted under the effect of the pressurized fluid. In this way mutual canting or jamming of adjacently located items can be prevented or at least counteracted. The stack or at least a portion thereof can be loosened up when subject to lifting.

In this way, the first discharge outlets are adapted to eject the pressurized fluid in a helical or screw-like configuration so as to exert an elevation effect to the stack of items. Consequently, the stack of items positioned on the support surface may experience a screw-like helical and upwardly directed elevating motion when the first discharge outlets are exposed to the pressurized fluid.

In another embodiment at least some of the first discharge outlets are oriented upwardly, i.e. at an angle of at least 15°, at least 30° or at least 45°. In this way the pressurized fluid can exert an upwardly directed force effect to the stack of items or at least to a portion thereof. Moreover, when several first discharge outlets are arranged at an axial distance relative to each other, e.g. along the outer circumference of the support member, not only a lowermost but several items of the stack, that are located at a given axial distance from each other, can simultaneously experience a rising force effect. By means of several upwardly oriented first discharge outlets a rising force can be rather smoothly and homogeneously applied to the stack of items. In this way the stack of items becomes less prone to jamming of canting when subject to repeated rising into the elevated position. According to another embodiment, the first discharge outlets are substantially oriented in axial direction and are located in or beneath the support surface of the carrier unit. In this configuration, the first discharge outlets serve to exert an axially and upwardly directed force effect to at least the bottom or undermost item of the stack of items. Also here, size, number and location of the various first discharge outlets typically match with the size and geometry of the items to be separated.

In another embodiment, the support surface of the carrier unit is located at the bottom of a hollow pedestal portion of the carrier unit that extends in axial direction from the carrier unit. In this embodiment, the hollow pedestal portion, which may be of tubular or cylindrical shape, confines an interior volume that substantially matches with the shape of the items. Here, the hollow pedestal portion may serve as a guiding structure providing a circumferential confinement for the stack of items.

In this embodiment, the confined volume, in which the stack is axially displaceable between the initial and elevated position, may be almost entirely provided by the hollow pedestal portion. Here, the gripping unit may only get in contact with an upper free end of the pedestal portion to take and to grip the uppermost item of the stack. The gripping unit may then comprise a shape that substantially matches with the cross-section of the pedestal portion. When in mutual abutment or contact configuration, the interface formed between the gripping unit and the carrier unit's hollow pedestal portion may comprise at least one discharge outlet to provide controlled exhaust of supplied pressurized fluid.

According to another aspect the invention also relates to a method of separating an item from a stack of items by making use of the above described separating device. The method of separating comprises the steps of providing a stack of items on a support surface of a carrier unit and applying a pressurized fluid to the stack by means of at least a first discharge outlet. As a consequence and in a further step, the stack of items is raised from an initial position into an elevated position relative to the support surface under the effect of the pressurized air. Typically, the entire stack or at a portion thereof, including several items, is raised by the pressurized fluid emanating from the at least first discharge outlet. Alternatively, it may be sufficient, when only an uppermost portion of the stack is raised into the elevated position by means of the pressurized fluid. By means of the pressurized fluid the stack or at least several items thereof are kept in the elevated position to allow and to support an intuitive and easy gripping of the uppermost item.

As soon as the stack reaches the elevated position, the uppermost item is gripped by means of a suction nozzle of a gripping unit. Thereafter, the gripping unit may be axially and/or transversally displaced relative to the carrier unit. Prior or during lifting of the uppermost item by means of the gripping unit's suction nozzle, discharge of the pressurized fluid through the first discharge outlet is either reduced or completely stopped so that the residual stack returns into its initial position, e.g. under the effect of gravity.

Various further steps of the method for separating an item from the stack of items are apparent from the structure and operation mode of the separating device as described above.

It will be further apparent to those skilled in the art that various modifications and variations can be made to the present invention without departing from the spirit and scope of the invention. Further, it is to be noted, that any reference signs used in the appended claims are not to be construed as limiting the scope of the present invention.

BRIEF DESCRIPTION OF THE DRAWINGS

In the following, various embodiments of the invention will be described by making reference to the drawings, in which:

FIG. 1 shows a first embodiment of a separating device in a perspective side view, FIG. 2 shows an isolated perspective illustration of the separating device's gripping unit and FIG. 3 is indicative of a perspective view of the separating device's carrier unit.

FIGS. 7*a*-7*e* illustrate the sequence of separating steps in accordance with FIGS. 4*b*-4*f*.

DETAILED DESCRIPTION

Figure 4A:
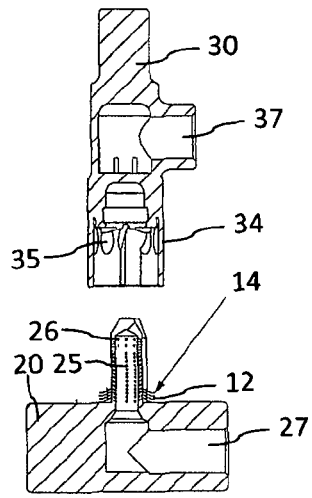
FIG. 4*a* shows a cross-section through the separating device in an initial configuration.

The separating device 10 as illustrated in FIG. 1 comprises a carrier unit 20 and a gripping unit 30. Carrier unit 20 and gripping unit 30 are at least displaceable in axial direction (z), which extends vertical in the sketch of FIG. 1. The gripping unit 30 resembles a suction cup and can be lowered into an abutment configuration onto the carrier unit 20 as illustrated in FIG. 1. Moreover, the gripping unit 30 can be raised from the carrier unit as becomes apparent from FIGS. 4*a* and 4*c*, especially for separating an uppermost item 14 from a stack 12 of items 14.

The gripping unit comprises a suction port 37 to connect the gripping unit 30 to a vacuum source. In this way, a suction effect can be applied to an uppermost item 14 of the stack 12.

The carrier unit 20 as separately illustrated in FIG. 3 comprises a support surface 24 on which a stack 12 of items 14 is to be supported. The carrier unit 20 further has a support member 23 comprising a pin-shaped geometry and extending in axial direction (z) towards the gripping unit 30, which is typically located above the carrier unit 20.

In order to correctly align gripping unit 30 and carrier unit 20 in the lateral plane (x, y) the separating device 10 comprises a centering structure 28. The centering structure 28 is comprised of at least two components and is further divided among the gripping unit 30 and the carrier unit 20. On the carrier unit 20 the centering structure 28 comprises two centering pins 21, 22 located on opposite sides of the support member 23, which is sandwiched therebetween. Corresponding to the shape and position of the centering pins 21, 22 the gripping unit 30 comprises respective centering receptacles 31, 32 as illustrated in FIG. 2. Since the centering pins 21, 22 comprise a bevelled or conically-shaped free end, a mutual alignment of carrier unit 20 and gripping unit 30 in the lateral plane (x, y) can be obtained when the centering pins 21, 22 enter the respective centering receptacles 31, 32 of the gripping unit 30.

Figure 4B:
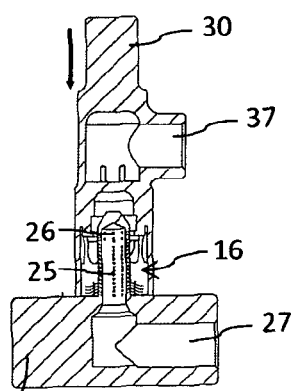
FIG. 4*b* shows the separating device according to FIG. 4*a* with gripping unit and carrier unit in mutual abutment configuration, FIG. 4*c* indicates application of a pressurized fluid to the carrier unit.
Figure 4C:
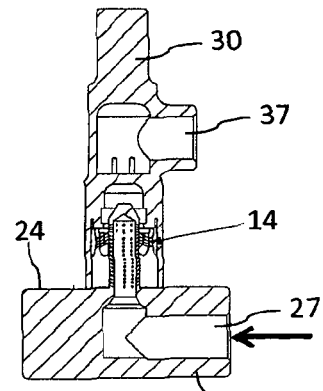
FIG. 4*d* is indicative of additionally applying a vacuum or suction effect to the gripping unit.
FIG. 4*e* shows the separating device after supply of pressurized air to the carrier unit has been cut off and FIG. 4*f* shows the uppermost item attached to the gripping unit separating in axial direction from the carrier unit.
FIG. 4*g* is a schematic illustration of the support member according to FIG. 3 with helically arranged discharge outlets.
FIG. 4*h* shows a cross section through the support member according to FIG. 3 and FIG. 4
Figure 4D:
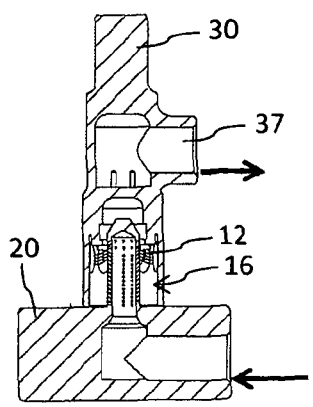

Additionally, the gripping unit 30 comprises a hollow portion or a receptacle 33 between the centering receptacles 31, 32. This receptacle 33 is adapted to receive the support member 23 together with the stack 12 of items 14 provided on the support surface 24. When the gripping unit 30 is lowered onto the support surface 24 of the carrier unit 20 the receptacle 33 of the gripping unit 30 forms a confined volume 16, in which the entire stack 12 of items 14 can be slidably displaced between an initial position as illustrated in FIGS. 4*a* and 4*b* and an elevated position as indicated in FIGS. 4*c* and 4*d*.

For lifting or raising the entire stack 12 of items 14 the carrier unit 20 is equipped with a series of first discharge outlets 25, which according to the embodiment of FIGS. 1-4 are provided at the outer circumference of the support member 23. The first discharge outlets 25 are typically spread in axial direction (z) as well as along the circumference of the pin-shaped support member 23.

Figure 4E:
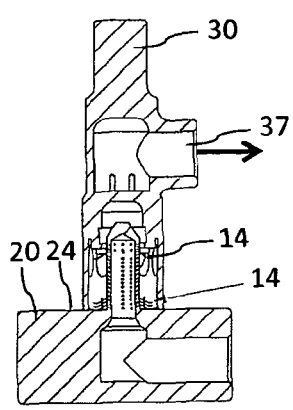
Figure 4F:
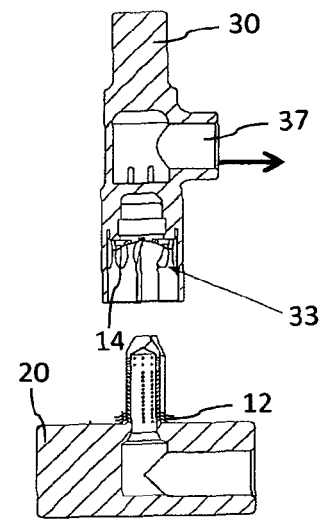
Figure 4G:
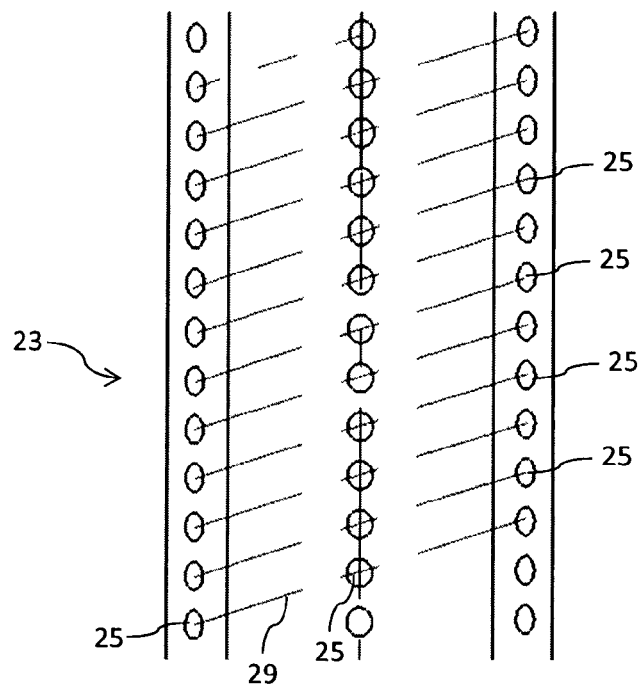

In particular, the first discharge outlets 25 are arranged in a helical way along the outer circumference of the support member 23 as shown in detail FIG. 4*g*. There, various discharge outlets 25 consecutively arranged along the outer circumference of the support member 23 are located at given axial offset relative to each other. In effect, adjacently located first discharge outlets 25 are arranged on an imaginary helical path 29 around the outer circumference of the pin-shaped support member 23. The disc-shaped but non-planar items 14 comprising a central orifice 15 are stacked on top of each other in such a way, that the support member 23 intersects the orifices 15 of the items 14 in axial direction (z).

Figure 4H:
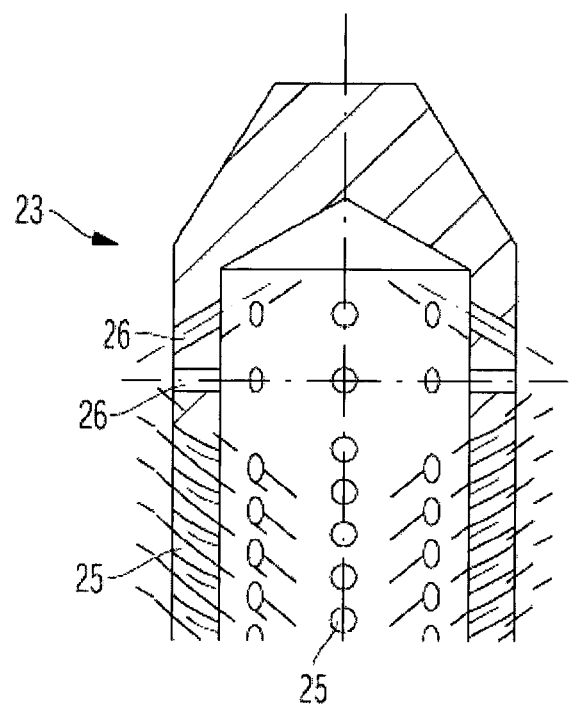
Figure 5:
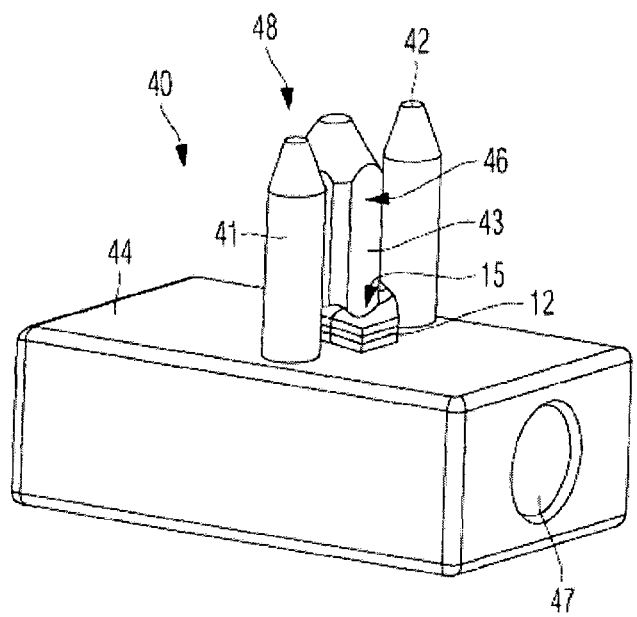
FIG. 5 is indicative of a perspective view of a second embodiment of a carrier unit.

By applying a fluid pressure to the supply port 27 of the carrier unit 20, the supplied pressurized fluid, e.g. in form of a pressurized liquid or in form of a pressurized gas, such like air, will emanate from the first discharge outlets 25. The discharge outlets 25 may also extend slightly upwardly, e.g. at an angle of at least 15°, 30° or of at least 45° with respect to the lateral plane (x, y), as shown in FIG. 4h. Consequently, at least some or even all items 14 of the stack 12 may simultaneously experience a lifting force that serves to raise the entire stack 12 into an elevated position as indicated in FIGS. 4c and 4d when the pressurized fluid emanates from the first discharge outlets 25. FIG. 4g is illustrative of the inside facing wall of the hollow shaped support member 23 and therefore just indicates the location and position of the various discharge outlets 25.

With the gripping unit 30 in mutual abutment with the carrier unit 20 and with the stack 12 located in an elevated position, the gripping unit 30, in particular its suction port 37 is coupled and connected to a vacuum source so as to provide a suction effect at various suction nozzles 38 that are provided at an upper end face of the gripping unit's 30 receptacle 33. Thereafter and as indicated in FIG. 4e, supply of the pressurized fluid to the carrier unit 20 may be reduced or stopped so that the residual stack 12 returns into its initial position as indicated in FIG. 4e.

Since the suction nozzles 38 are still coupled with the not illustrated vacuum source, the uppermost item 14 of the stack of items 12 remains attached to the suction nozzles 38 and hence to the gripping unit 30. As indicated in FIG. 4f, the gripping unit 30 can be at least axially displaced relative to the carrier unit 20 for separating the particular item 14 from the stack 12.

In the embodiment according to FIGS. 1-4f, the gripping unit 30 with its sidewall 34 confining the receptacle 30 and thus forming the confined volume 16 may sealingly engage and may sealingly abut with the support surface 24 of the carrier unit 20. Additionally and as illustrated for instance in FIG. 1, the gripping unit 30 comprises various discharge outlets 35, 36 penetrating the sidewall 34 in radial direction. These discharge outlets 35, 36 may serve as exhaust ports for discharging the pressurized fluid from the confined volume 16 in a rather controlled way.

By means of a sealed engagement of carrier unit 20 and gripping unit 30 and by means of the various discharge outlets 35, 36 a particular ram pressure may build up in the confined volume 16 and hence inside the receptacle 33, by way of which lifting of the stack 12 of items 14 and keeping of the stack 12 in the elevated position can be facilitated and controlled.

Additionally and as indicated for instance in FIGS. 3 and 4a, and shown in more detail in the cross section according to FIG. 4h, the support member 23 comprises two different types of discharge outlets 25, 26. While the first discharge outlets 25 may extend at least slightly in upward direction for raising the stack 12 the second discharge outlets 26 are provided at an upper end section of the support member 23. In contrast to the first discharge outlets 25, the second discharge outlets 26 serve to provide a sealing or blocking fluid. Hence, the second discharge outlets 26 may point radially outwardly and/or at least slightly downwardly, e.g. at an angle of at least 5°, 10°, 15° or even 30° in order to limit an upwardly directed displacement of the stack 12 of items 14.

The second discharge outlets 26 of the support member 23 may cooperate and correspond with the discharge outlets 36 of the gripping unit 30 while the discharge outlets 35 of the gripping unit 30 may serve to provide an exhaust port for the pressurized fluid entering the confined volume 16 or the receptacle 33 via the first discharge outlets 25 of the carrier unit 20.

By means of the rather controlled supply and exhaust of pressurized fluid into and out of the confined volume 16 a cushion of pressurized fluid may form which may not only keep the stack in the elevated position but which may also serve to loosen up the stack 12 in axial direction (z).

Additionally and by means of the second discharge outlets 26 the stack 12 can be elevated in a well-defined elevated position, in which the uppermost item 14 is always located in a well-defined axial position rather irrespective from the height of the stack 12. In this way, the mutual positioning of gripping unit 30 and carrier unit 20 can be conducted irrespective of the actual size or height of the stack 12. In this way, no sophisticated and elaborate sensor arrangement is required for a precise mutual positioning and alignment of carrier unit 20 and gripping unit 30.

The embodiment as described in FIGS. 5-7e only substantially differs from the embodiment according to FIGS. 1-4f by a varying carrier unit 40. Here and in contrast to the carrier unit 20 as illustrated in FIG. 3, the carrier unit 40 according to FIG. 5 also comprises a supply port 47 for a supply of pressurized fluid and also features a substantially planar-shaped support surface 44. Moreover, also the carrier unit 40 comprises two centering pins 41, 42 of a centering structure 48 and a support member 43 located there between and extending in axial direction (z).

As indicated in the various cross-sections according to FIGS. 7a-7e the support member 43 also comprises second discharge outlets 46 at a free and upper end thereof in order to provide a sealing or blocking fluid, by way of which an upwardly directed displacement of the stack 12 can be precisely limited.

Figure 6:
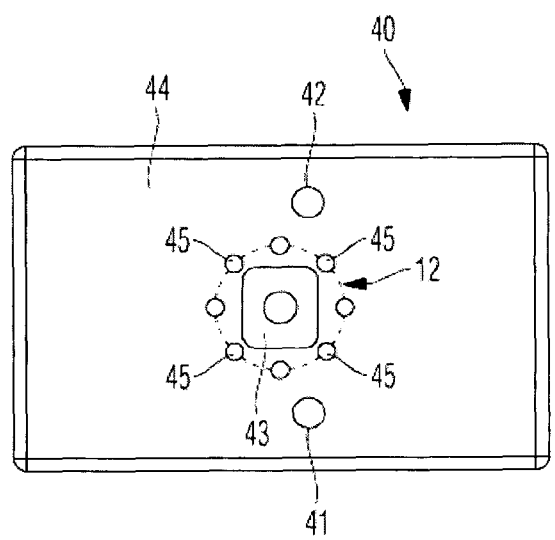
FIG. 6 shows the carrier unit according to FIG. 5 from the top.

The embodiment according to FIGS. 5-7e differs from the embodiment according to FIG. 1-4f by the design and arrangement of the first discharge outlets 45. In contrast to the embodiment according to FIG. 3, the first discharge outlets 45 of the carrier unit 40 are located in the support surface 44 as indicated in the top view according to FIG. 6. Moreover, the first discharge outlets 45 are substantially oriented and extend in axial direction (z). In FIG. 6, the position of the stack 12 of annular items 14 is indicated with a dashed circle in relation to the position of the axially oriented or axially extending discharge outlets 45 that may flush with the support surface 44 of the carrier unit 40.

As indicated in the various cross-sections according to FIGS. 7a-7e, the supply port 47 is in fluid connection with an annular supply channel 49, from which the various first discharge outlets 45 extend upwardly into the support surface 44. When supplying a pressurized fluid to the supply port 47, the undermost item 14 of the stack 12 is subject to a lifting effect as indicated in FIG. 7b until the uppermost item 14 reaches the elevated position as defined by the second discharge outlets 46 adapted to provide a sealing or blocking fluid as already described in connection with the embodiment according to FIGS. 1-4f.

Figure 8:
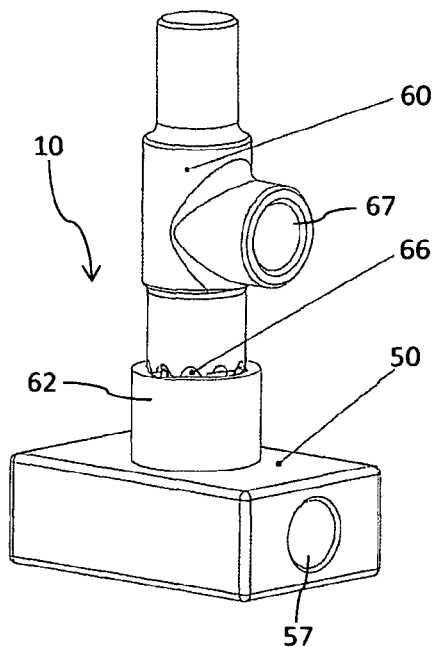
FIG. 8 shows a further embodiment of the separating device in a perspective view.
Figure 9:
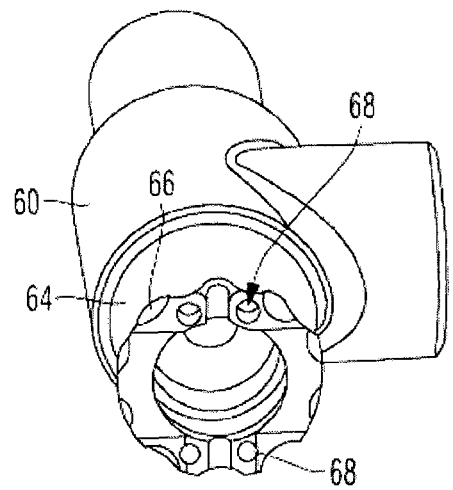
FIG. 9 shows the gripping unit in an isolated view.
Figure 10:
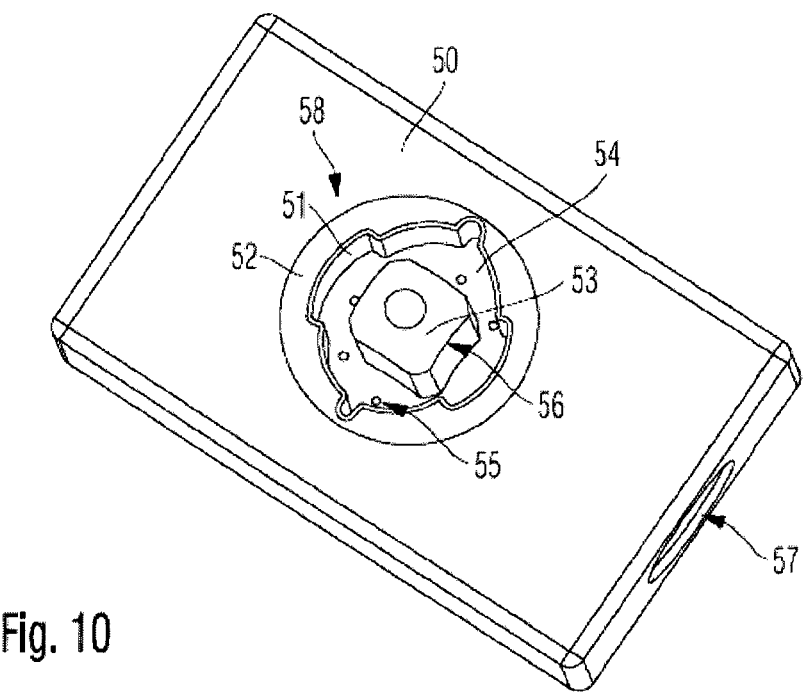
FIG. 10 shows a perspective view of the carrier unit according to FIG. 8, FIGS. 11*a*-11*f* correspond to the various steps of separating an item from a stack of items with the embodiment according to FIGS. 8-10 in a sequence corresponding to the sequence of FIGS. 4*a*-4*f*.

The embodiment according to FIGS. 8-11f substantially differs from the previous embodiment according to FIGS. 1-7e in that the carrier unit 50 comprises a support surface 54 in form of a bottom of a hollow pedestal portion 52 as indicated in FIG. 10. Inside the hollow pedestal portion 52 there is also provided a support member 53 extending in axial direction (z), which is functionally substantially identical to the support members 23, 43. The support member 53 also comprises second discharge outlets 56 at its free and upper end in order to provide a sealing or blocking fluid.

The structure of the hollow pedestal portion 52 and the support member 53 centrally located therein form a receiving and guiding shaft 51 for the stack 12 of items 14. By means of the pedestal portion 52, the stack 12 can also be confined and guided along its outer circumference while the inner circumference of the stack 12 may be substantially guided and supported by the support member 53.

The first discharge outlets 55 are located in the support surface 54 at the bottom of the pedestal portion 52.

In contrast to the embodiments of FIGS. 1-7e, it is the hollow pedestal portion 52 according to FIG. 10 which substantially forms a confined volume when the gripping unit 60 lowers and approaches the carrier unit 50. As indicated in FIG. 9, the gripping unit 60 comprises a somewhat cylindrically-shaped lower sidewall 64 that matches with the geometry and cross-section of the pedestal portion 52.

Additionally, at the lower rim the sidewall 64 of the gripping unit 60 comprises various radially outwardly extending discharge outlets 66 in form of arc-shaped recesses. These discharge outlets 66 serve the same purpose and act in the same or similar way as the discharge outlets 35 and/or 36 of the gripping unit 30 according to FIG. 1. Moreover, the gripping unit 60 is also provided with a suction port 67 and with various suction nozzles 68.

The suction nozzles 68 are provided at the lower face of the gripping unit's 60 sidewall 64 as indicated in FIG. 9.

Even though not explicitly illustrated the carrier unit 50 and gripping unit 60 as shown in FIGS. 8-10 also comprise a centering structure 58 by way of which carrier unit 50 and gripping unit 60 can be precisely aligned in the lateral plane (x, y) when the gripping unit 60 approaches the carrier unit 50 in axial direction (z). The centering structure 58 may feature bevelled or tilted surfaces at the mutually engaging portions of the pedestal portion 52 and the sidewall 64.

The sequence of FIGS. 11a-11f matches and corresponds to the sequence according to FIGS. 4a-4f. Comparable to the embodiment according to FIGS. 7a-7e the carrier unit 50 comprises a supply port 57 which is in fluid communication with an annular supply channel 49, from which the various first discharge outlets 55 extend in axial direction, as for instance indicated in FIG. 11a.

LIST OF REFERENCE NUMERALS 10 separating device
12 stack
14 item
15 orifice
16 confined volume
20 carrier unit
21 centering pin
22 centering pin
23 support member
24 support surface
25 discharge outlet
26 discharge outlet
27 supply port
28 centering structure
29 helical path
30 gripping unit
31 centering receptacle
32 centering receptacle
33 receptacle
34 sidewall
35 discharge outlet
36 discharge outlet
37 suction port
38 suction nozzle
40 carrier unit
41 centering pin
42 centering pin
43 support member
44 support surface
45 discharge outlet
46 discharge outlet
47 supply port
48 centering structure
49 supply channel
50 carrier unit
51 shaft
52 pedestal portion
53 support member
54 support surface
55 discharge outlet
56 discharge outlet
57 supply port
58 centering structure
59 supply channel
60 gripping unit
64 sidewall
66 discharge outlet
67 suction port
68 suction nozzle

The invention claimed is:

1. A separating device for separating an item from a stack of items, the separating device comprising:
   a carrier unit having a support surface to support numerous items stacked on top of each other in an axial direction (z), and having at least a first discharge outlet oriented and extending upwardly and being configured to direct a pressurized fluid away from the support surface to at least partially raise the stack of items from an initial position into an elevated position relative to the support surface and to keep at least several items of the stack in the elevated position; and
   a gripping unit having at least one suction nozzle to grip the uppermost item when the stack is in the elevated position, wherein the carrier unit and the gripping unit are displaceable relative to each other at least in the axial direction (z).

2. The separating device according to claim 1, wherein the carrier unit comprises at least a second discharge outlet for the pressurized fluid to keep the stack of items in the elevated position.

3. The separating device according to claim 2, wherein the carrier unit comprises a support member extending in axial direction (z) from the support surface to guide the stack of items in axial direction (z) between the initial position and the elevated position.

4. The separating device according to claim 3, wherein the support member comprises an elongated pin to extend through an orifice of each item.

5. The separating device according to claim 3, wherein the second discharge outlet is located at an upper end section of the support member facing away from the support surface.

6. The separating device according to claim 5, wherein the second discharge outlet is oriented radially outwardly and is located flush with the outer circumference of the support member.

7. The separating device according to claim 1, wherein the carrier unit and the gripping unit are transferable into a mutual abutment configuration to form a confined volume in which the stack of items is displaceable between the initial and elevated position.

8. The separating device according to claim 2, wherein the gripping unit comprises at least one discharge outlet cooperating with the carrier unit's second discharge outlet to form a cushion of the fluid for keeping the stack of items in the elevated position.

9. The separating device according to claim 1, further comprising a centering structure to mutually align the carrier unit and the gripping unit in a lateral plane (x, y) extending perpendicular to the axial direction (z).

10. The separating device according to claim 9, wherein the centering structure comprises at least one centering pin extending from the carrier unit in axial direction (z) to engage with a correspondingly shaped centering receptacle of the gripping unit.

11. The separating device according to claim 3, wherein the at least the first discharge outlet is included among numerous first discharge outlets located along the outer circumference of the support member.

12. The separating device according to claim 11, wherein the first discharge outlets are helically positioned along the support member.

13. The separating device according to claim 11, wherein at least some of the first discharge outlets are oriented upwardly to exert an elevation effect to the stack of items.

14. The separating device according to claim 1, wherein the first discharge outlets are substantially oriented in axial direction (z) and are located in or beneath the support surface.

15. The separating device according to claim 14, wherein the support surface is located at the bottom of a hollow pedestal portion extending in axial direction (z) from the carrier unit.

16. A method of separating an item from a stack of items, the method comprising:

providing a stack of items stacked on top of each other in an axial direction (z) on a support surface of a carrier unit having at least a first discharge outlet oriented and extending upwardly and being configured to direct a pressurized fluid away from the support surface to at least partially raise the stack of items from an initial position into an elevated position relative to the support surface and to keep at least several items of the stack in the elevated position;

applying a pressurized fluid to the stack using at least the first discharge outlet; and gripping the uppermost item when the stack is in the elevated position using a suction nozzle of a gripping unit, the suction nozzle configured to grip the uppermost item when the stack is in the elevated position, wherein the carrier unit and the gripping unit are displaceable relative to each other at least in the axial direction (z).

17. A separating device comprising:

a carrier unit comprising a support surface to support a plurality of items stacked on top of each other in a vertical direction, the carrier unit comprising a discharge outlet oriented and extending upwardly to flow a pressurized fluid, wherein the discharge outlet is configured to direct a pressurized fluid away from the support surface, wherein the carrier unit is configured to elevate the plurality of items in the vertical direction from an initial position to an elevated position relative to the support surface and to maintain one or more of the plurality of items in the elevated position; and a gripping unit comprising a suction nozzle, the gripping unit displaceable relative to the carrier unit in the vertical direction, the gripping unit configured to grip an uppermost item of the one or more of the plurality of items in the elevated position.

* * * * *